Dec. 2, 1947. E. F. W. ALEXANDERSON ET AL 2,431,903

ELECTRIC CONTROL CIRCUITS

Filed Jan. 16, 1941

Inventors:
Ernst F. W. Alexanderson,
Albert H. Mittag,
by Harry E. Dunham
Their Attorney.

Patented Dec. 2, 1947

2,431,903

UNITED STATES PATENT OFFICE 2,431,903

ELECTRIC CONTROL CIRCUITS

Ernst F. W. Alexanderson and Albert H. Mittag, Schenectady, N. Y., assignors to General Electric Company, a corporation of New York Application January 16, 1941, Serial No. 374,716

15 Claims. (Cl. 175—363)

1

Our invention relates to electric control circuits and more particularly to circuits for controlling electric valve translating apparatus.

In the control of electrical apparatus, it is frequently desirable to produce voltages of peaked wave form, such as alternating voltages which are symmetrical with respect to the positive and negative half cycles, and to employ only apparatus which is of rugged construction and which requires a minimum of inspection and repair. In accordance with the teachings of our invention described hereinafter, we provide new and improved control circuits of this nature.

It is an object of our invention to provide new and improved electric control circuits.

It is another object of our invention to provide new and improved electric circuits for producing an alternating voltage of peaked wave form.

It is a further object of our invention to provide new and improved electric control circuits for controlling electric translating apparatus, such as electric valve means of the type employing an ionizable medium such as a gas or a vapor.

Briefly stated, in the illustrated embodiments of our invention we provide new and improved electric circuits of the resonating type which produce or generate alternating voltages of peaked wave form in which the peaks produced during the positive and negative half cycles of an associated source are symmetrical. The circuits include a capacitance and a saturable inductance which are energized from an associated alternating current source to produce across the terminals of an output circuit, or a pair of output circuits, voltages of peaked wave form.

Figure 1:
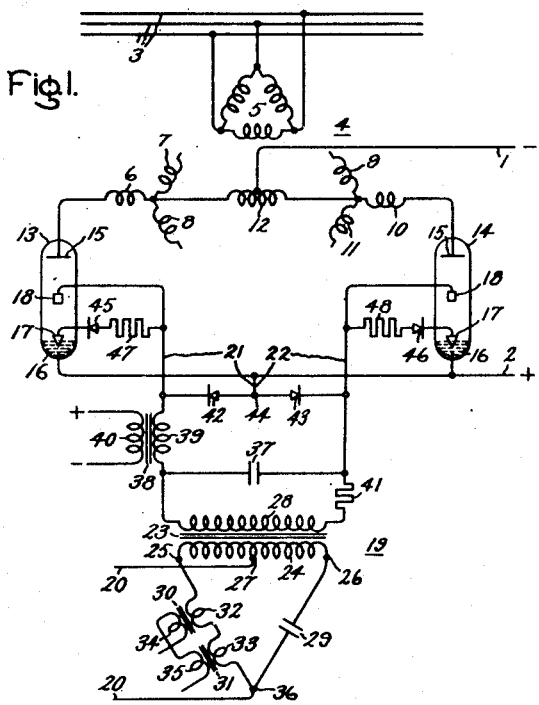
Figure 2:
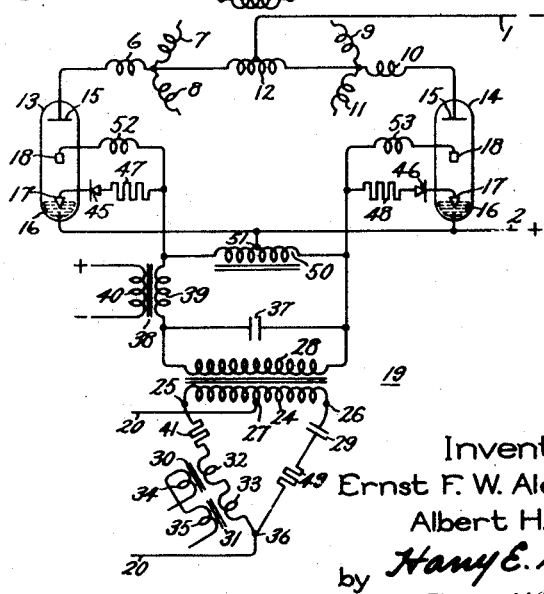

For a better understanding of our invention, reference may be had to the following description taken in connection with the accompanying drawing, and its scope will be pointed out in the appended claims. Fig. 1 diagrammatically illustrates the embodiment of our invention as applied to an electric translating system including a plurality of electric valve means, and Fig. 2 is a modification of the arrangement shown in Fig. 1.

Referring now to Fig. 1 of the drawing, our invention is there illustrated as applied to an electric valve translating system or converter of the make-alive type for energizing a direct current load circuit, comprising conductors 1 and 2, from an associated alternating current supply circuit 3 through electric translating apparatus comprising a transformer 4 having a plurality of primary windings 5 and two groups of secondary windings 6, 7, 8 and 9, 10, 11, respectively. The two groups of secondary windings may be interconnected through an interphase transformer 12 to cause the system to operate as a double three-phase or a double Y system. The translating apparatus also includes a plurality of electric valve means which are connected to secondary windings 6–11, inclusive. Only electric valves 13 and 14, which are connected to secondary windings 6 and 10, are shown in the drawing. The electric valves 13 and 14 are preferably of the type comprising an ionizable medium such as a gas or a vapor, capable of supporting an arc discharge, and each includes an anode 15, a cathode 16 of the self-reconstructing type, an immersion-ignitor control member or make-alive electrode 17 and a transfer or auxiliary electrode 18.

We provide a control or excitation circuit 19 which is energized from a suitable source of alternating current 20 for supplying to an output circuit, or a pair of output circuits 21 and 22, periodic voltages of peaked wave form. The excitation circuit 19 produces an alternating voltage of peaked wave form and by virtue of apparatus described hereinafter voltages of predetermined polarity are selectively transmitted to output circuits 21 and 22 so that these circuits are energized alternately.

The excitation circuit 19 includes a transformer 23 having a primary winding 24 provided with terminal connections 25 and 26 and a connection 27 electrically intermediate the terminal connections. Interposed between the source 20 and primary winding 24, we provide suitable phase shifting apparatus which may comprise a phase shifting network including a capacitance 29 and a variable impedance element such as a pair of saturable inductive devices 30 and 31 having windings 32 and 33, and unidirectional biasing or control windings 34 and 35, respectively. The inductive devices 30 and 31 comprise one branch of the phase shifting network and the capacitance 29 comprises the other branch. The common juncture 36 of the variable impedance element of the phase shifting network and the capacitance 29 is connected to one terminal of the source 20 and the other terminal of the source is connected to the intermediate connection 27.

We provide a capacitance 37 and a saturable inductive device or inductance 38, having a winding 39, which together constitute a resonant circuit of the nonlinear type. That is, the circuit is nonlinearly resonant with respect to the magnitude of the voltage of source 20, the inductive reactance of device 38 having a value which is substantially greater than the capacitive reactance of the excitation circuit 19 within the lower region of the voltage of the source, and smaller than the capacitive reactance within the upper region so that an impulse of voltage is produced when the inductive device 38 saturates. It is to be understood that this circuit, including the capacitance 37 and inductive device 38, is non-linearly resonant with respect to the magnitude of the voltage of source 20 and that the inductive device 38 saturates during both the positive and negative half cycles of voltage of source 20. The inductive device 38 may be provided with a control winding 40 which may be termed a biasing winding connected to be energized from a direct current source represented by the conductors marked + and to shift the phase displacement between the positive and negative impulses of voltage produced by excitation circuit 19 to provide a means for balancing the currents conducted by the respective groups of secondary windings in the electric valve translating system. The feature of controlling the load division between the groups of electric valves associated with windings 6—8 and 9—11, respectively, by controlling the magnetization of the saturable inductive devices in peaking circuits where the impulse of voltage is produced by the abrupt variation of the inductive reactance of the device, is disclosed and broadly claimed in United States Letters Patent No. 2,248,600, granted July 8, 1941, upon my joint application with Albert H. Mittag, and which is assigned to the assignee of the present application.

In order to provide a damping or stabilizing effect, we employ a stabilizing resistance 41 connected in circuit with the capacitance 37 and the inductive device 38 so that the positive and negative peaks of voltage produced by the excitation circuit 19 are maintained symmetrical. We provide means for connecting the excitation circuit to the output circuits 21 and 22, such as a pair of oppositely poled unidirectional conducting devices 42 and 43 having a common juncture 44 connected to the cathodes 16 of electric valves 13 and 14. In this manner, impulses of voltage of one polarity are supplied to output circuit 21, and impulses of voltage of opposite polarity are supplied to output circuit 22.

We employ unidirectional conducting devices 45 and 46 connected in series relation with control members 17 of electric valves 13 and 14, and transfer resistances 47 and 48 which are connected in series relation with unidirectional conducting devices 45 and 46, respectively. Auxiliary electrodes 18 are connected to the transfer resistances 47 and 48 in the manner shown in order that the potential of these electrodes be raised by the transmission of current to the control members 17, thereby effecting a transfer of the excitation current from the control members 17 to the auxiliary electrodes 18 upon the initiation of arc discharges within the electric valves 13 and 14.

In the design of the excitation system or in the design of the circuits for producing the alternating voltages of peaked wave form, the capacitive reactance of the circuit may be obtained principally from the capacitance 37, or may be obtained by the combined capacitive reactance of capacitance 37 and capacitance 29. Of course, it is to be appreciated that instead of employing a phase shifting network of the static impedance type, we may employ a phase shifter of the rotary type having relatively movable primary and secondary members in which case it would be necessary to design the excitation circuit so that the capacitance 37 resonates properly with the inductive device 38.

A further important feature is the choice of values for the constants of the excitation circuit to maintain the losses at a small value consistent with positive and reliable operation in the production of the alternating control voltage. We have found that there is a state of resonance, between the capacitive reactance of the circuit and the inductive reactance, which may be only a partial resonance when the inductive reactance is predominant over the capacitive reactance. We have also found, in the case of partial resonance, that if the inductive reactance is highly predominant, the wave shape of the alternating voltage is symmetrical during positive and negative half cycles. Upon decreasing the value of the inductive reactance, a critical point is obtained at which the peaks of voltage do not occur at precise points during the cycles of voltage of source 20. However, it is desirable to maintain the inductive reactance at or above a predetermined minimum value in order to obtain precise control by assuring the production of definite, well defined peaks of voltage. We have found that the use of a stabilizing or damping resistance 41 not only tends to maintain a symmetrical relationship between the voltages of peaked wave form during positive and negative half cycles but also tends to maintain a state of symmetrical resonance, that is, symmetry of the oscillation characteristic during positive and negative half cycles of the voltage of source 20, whereby well defined peaks of voltage are produced.

The operation of the embodiment of our invention shown in Fig. 1 will be explained by considering the system when it is operating to energize the direct current load circuit from the alternating current supply circuit 3. In the particular arrangement illustrated, each secondary winding conducts current during 120 electrical degrees but during only 60 electrical degrees with any one other phase winding in another group. Furthermore, certain windings in each group conduct current during intervals displaced 180 electrical degrees with respect to windings in another group. For example, winding 6 conducts current during intervals displaced 180 electrical degrees from the winding 10; consequently, electric valves 13 and 14 must be rendered conducting during corresponding intervals. The excitation circuit 19 produces an alternating voltage of peaked wave form which renders valves 13 and 14 conducting alternately. By virtue of the connection of the unidirectional conducting devices 42 and 43, 45 and 46, only impulses of current of one polarity are transmitted to output circuits 21 and 22. Of course, only unidirectional current is transmitted to the control member 17 by virtue of unidirectional conducting devices 45 and 46. During half cycles of voltage of one polarity of source 20, a positive impulse of voltage is transmitted to control member 17 of electric valve 13 and the transmission of current through the resistance 47 raises the potential of the auxiliary electrode 18 so that current is transferred from the control member 17 to the auxiliary electrode 18 as soon as an arc discharge is established. The circuit through which this energizing impulse is transmitted includes secondary winding 28, winding 39 of inductive device 38, resistance 47, unidirectional conducting device 45, control member 17, cathode 16, unidirectional conducting device 43 and resistance 41. One way in which the operation of the excitation circuit may be considered is that during the lower region of voltage of source 20, that is, during the first part of each cycle, the inductive device 38 provides a relatively high impedance to the flow of current so that very little current is transmitted to the control member 17. As the voltage of the source 20 increases still further, the current flowing through winding 39 of the device 38 causes the device to saturate, effecting an abrupt decrease in the value of the inductive reactance, thereby effecting a substantial increase in the amount of current transmitted to control members 17. In other words, an impulse of voltage or current is produced. At this time, the capacitance 37 discharges through the circuit including winding 39, resistance 47, unidirectional conducting device 45, control member 17, and unidirectional conducting device 43, thereby assuring the transmission of a positive impulse of current to the control member 17.

During the next succeeding half cycle of voltage of source 20, the excitation circuit 19 will produce an impulse of voltage of opposite polarity to energize control member 17 of electric valve 14. This circuit includes secondary winding 28, stabilizing resistance 41, transfer resistance 48, unidirectional conducting device 46, control member 17, cathode 16, unidirectional conducting device 42 and winding 39. Of course, the capacitance 37 also discharges through the resistance 48, unidirectional conducting device 46, control member 17, unidirectional conducting device 42 and winding 39 as soon as the inductive reactance of winding 39 decreases substantially due to the saturation of device 38.

The phase of the alternating voltage of peaked wave form relative to the voltage of circuit 3 may be controlled by the variable energization of the control windings 34 and 35 of the inductive devices 30 and 31. In this manner, the magnitude of the voltage supplied to the direct current load circuit may be controlled or adjusted.

If it is found that the load current does not divide equally or does not divide in accordance with a desired ratio, the control winding 40 may be employed to establish a slight unidirectional bias, thereby varying the relative phase displacement between the positive and negative peaks of the voltage produced by excitation circuit 19, and consequently controlling the relative magnitudes of the currents conducted by the electric valves 13 and 14 and hence controlling the average currents and the amounts of power conducted by the groups of secondary windings.

It is to be understood that in the arrangement of Fig. 1 the electric valves (not shown) associated with windings 7 and 8 and 9 and 11 will, of course, be provided with two excitation circuits similar to excitation circuit 19, and that the current conducted thereby may be controlled in a similar manner.

Fig. 2 diagrammatically illustrates another embodiment of our invention which is similar in many respects to that shown in Fig. 1 and corresponding elements have been assigned like reference numerals. In the arrangement of Fig. 2, the stabilizing resistance 41 may be connected in the phase shifting network and may be connected in series relation with the variable impedance element comprising saturable inductive devices 30 and 31. When the stabilizing resistance 41 is connected in this manner, it is necessary in order to obtain a symmetrical alternating voltage of peaked wave form to connect another stabilizing resistance 49 in the other branch of the phase shifting network in series relation with the phase shifting capacitance 29. The resistance 49 also serves to obtain an additional phase displacement or adjustment between the voltage of source 20 and the phase of the alternating voltage of peaked wave form.

Instead of employing a pair of oppositely poled unidirectional conducting device 42 and 43, as shown in Fig. 1, we may employ a suitable coupling device such as an auto-transformer 50 having an intermediate connection 51 connected to the cathode 16 of electric valves 13 and 14.

When it is desired to operate the electric valve translating apparatus throughout a wide range extending from full load condition to light load condition, we have found that it is necessary to maintain the medium in an ionized condition by means of the excitation circuit 19, throughout a substantial portion of the anode-cathode voltage. With the arrangement of Fig. 1, the cathode spot is maintained for a period of time corresponding to approximately 20 electrical degrees. By connecting inductances 52 and 53 in series relation with the transfer or auxiliary electrodes 18 and 19, respectively, we have found that the cathode spot may be maintained alive for a period as long as 80 electrical degrees. The period of time during which the cathode spot is maintained by means of the excitation of circuit 19 is determined by the design of the inductances 52 and 53.

The operation of the embodiment of our invention shown in Fig. 2 is substantially the same as that described above in connection with Fig. 1 in so far as the principal aspects of the system are concerned.

Where a double-Y rectifying system is employed, such as that illustrated, the conduction period of the main anodes is such that each electric valve begins to conduct current 30 electrical degrees later when operated at light load than when it is operated at full load. This transition is brought about when the system changes from double three-phase operation to six-phase operation under light load conditions where the load current is not sufficient to produce equalization of phase voltages by means of the interphase transformer 12. Consequently, the inductances 52 and 53 maintain the cathode spot alive until the main anodes begin to conduct current, thereby assuring that the electric valves are maintained in condition for supplying the requisite load even though the load varies throughout wide ranges.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, a source of alternating current, an output circuit, apparatus energized from said source for producing an alternating voltage of peaked wave form comprising a saturable inductive reactance and a capacitive reactance, the inductive reactance when not saturated having a value which is substantially greater than the capacitive reactance during both the positive and negative half cycles of voltage of said source so that peaks of voltage are produced when the inductive reactance saturates, a stabilizing resistance connected between said source of alternating current and said capacitive reactance to maintain symmetrical the positive and negative peaks of the alternating voltage of peaked wave form, and an auto-transformer connected between said output circuit and said capacitive reactance and said inductive reactance.

2. In combination, a source of alternating current, an output circuit, apparatus energized from said source for producing an alternating voltage of peaked wave form comprising a transformer having a primary winding provided with terminal connections and a connection electrically intermediate the terminal connections, phase shifting means connected between said source and said primary winding including a variable impedance and a capacitance, means for connecting said intermediate connection and the common juncture of said variable impedance and said capacitance to said source, a saturable inductive reactance and a capacitive reactance connected to be energized from said secondary winding and constituting a circuit which is nonlinearly resonant with respect to the magnitude of the voltage of said source, the inductive reactance having a a value when not saturated which is substantially greater than the capacitive reactance during both the positive and negative half cycles of the voltage of said source so that impulses of voltage are produced when the inductive reactance saturates, a stabilizing resistance connected between said source of alternating current and said capacitive reactance so that the respective peaks of voltage produced during the positive and negative half cycles of voltage of said source are symmetrical, and means for connecting said capacitive reactance and said inductive reactance to said output circuit.

3. In combination, an alternating current supply circuit, a load circuit, electric translating apparatus connected between said circuits and comprising an electric valve means having an anode, a cathode, an immersion-ignitor control member and an auxiliary electrode and employing an ionizable medium capable of supporting an arc discharge, a source of alternating current, an excitation circuit energized from said source and including a saturable inductive reactance and a capacitive reactance which together constitute a circuit which is nonlinearly resonant to the magnitude of the voltage of said source, the inductive reactance when not saturated having a value which is substantially greater than the capacitive reactance so that an impulse of voltage is produced when the inductive reactance saturates, means for connecting said excitation circuit to said control member including an impedance connected in series relation with said control member, and means for connecting the auxiliary electrode to said excitation circuit at a point thereof to bypass said impedance element with respect to current flow from said excitation circuit to said cathode so that current is transferred from the control member to the auxiliary electrode upon the initiation of an arc discharge within said electric valve means.

4. In combination, an alternating current supply circuit, a load circuit, electric translating apparatus connected between said circuits and comprising an electric valve means having an anode, a cathode, an immersion-ignitor control member and an auxiliary electrode and employing an ionizable medium capable of supporting an arc discharge, a source of alternating current, an excitation circuit energized from said source and including a saturable inductive reactance and a capacitive reactance which constitutes a circuit which is nonlinearly resonant with respect to the magnitude of the voltage of said source, an inductive reactance when not saturated having a value which is substantially greater than the capacitive reactance so that an impulse of voltage is produced when the inductive reactance saturates, means including a unidirectional conducting device and a resistor in series relation therewith for connecting the control member to said excitation circuit, and means including an inductance element in series relation with the auxiliary electrode for connecting said auxiliary electrode to said excitation circuit at a point thereof to bypass said resistor and unidirectional conducting device with respect to current flow from said excitation circuit to said cathode so that current is transferred from the control member to the auxiliary electrode upon the initiation of an arc discharge within said electric valve means.

5. In combination, an alternating current circuit, a load circuit, electric translating apparatus connected between said circuits and comprising two groups of windings and a plurality of electric valve means connected with the windings and each comprising an anode, a cathode of the self-reconstructing type, an immersion-ignitor control member, an auxiliary electrode and employing an ionizable medium capable of supporting an arc discharge, an excitation circuit for energizing control members of electric valve means associated with windings in different groups which are arranged to conduct current during intervals displaced substantially one hundred eighty electrical degrees relative to the voltage of said alternating current circuit comprising means for producing an alternating voltage of peaked wave form including a saturable inductive reactance, means for connecting the control members to said excitation circuit, and means including an inductance element connected in series relation with each auxiliary electrode for connecting the auxiliary electrodes to said excitation circuit.

6. In combination, an alternating current circuit, a load circuit, electric translating apparatus connected between said circuits and comprising two groups of windings and a plurality of electric valve means connected with the windings and each comprising an anode, a cathode of the self-reconstructing type, an immersion-ignitor control member and employing an ionizable medium capable of supporting an arc discharge, a source of alternating current, an excitation circuit connected to said source for energizing control members of electric valve means which are arranged to conduct current during intervals displaced substantially one hundred eighty electrical degrees relative to the voltage of said alternating current circuit comprising means for producing an alternating voltage of peaked wave form including an inductive device which is saturable during half cycles of voltage of both polarities applied from said source, said inductive device including means for establishing a unidirectional magnetic bias therein to control the phase displacement between the positive and negative peaks of said alternating voltage to control the amounts of power transmitted by said two groups, and means for connecting the control members to said excitation circuit.

7. In combination, an alternating current circuit, a load circuit, electric translating apparatus connected between said circuits and comprising electric valve means of the type employing an ionizable medium and having an anode, a cathode and a control member, a source of alternating current, an excitation circuit for producing an alternating voltage of peaked wave form comprising a capacitance and a saturable inductive device, the inductive reactance of said device when not saturated having a value which is substantially greater than the capacitive reactance during both the positive and negative half cycles of voltage of said source so that an alternating voltage of peaked wave form is produced when the inductive reactance saturates, and a phase shifting network connected between said source and said excitation circuit and comprising a pair of branches one of which includes a variable impedance element for shifting the phase of the voltage of peaked wave form relative to the voltage of said source and a pair of stabilizing resistances each connected in a different one of said branches to maintain the voltage of peaked wave form symmetrical with respect to the positive and negative half cycles.

8. In combination, an alternating current supply circuit, a load circuit, electric translating apparatus connected between said circuits and comprising a plurality of groups of phase windings and a plurality of electric discharge paths each having a control member, said groups of phase windings being arranged to conduct current in parallel to said load circuit, and an excitation circuit connected to the control members of two electric discharge paths, one of which is connected in one group of said phase windings and the other of which is connected in the other group of phase windings and comprising a saturable inductive device for producing an alternating voltage of peaked wave form, said saturable inductive device including a control winding for controlling the phase displacement between the positive and negative impulses of peaked voltage and to control thereby the relative amounts of current conducted by the groups of phase windings.

9. In combination, a source of alternating current, a capacitance connected to be charged from said source during each half cycle of voltage thereof, means for discharging said capacitance comprising a saturable inductive device which is saturable on both half cycles of voltage of said source to cause abrupt increases in the discharge current of said capacitance during each half cycle of the source voltage, means connected in series relation with said capacitance and said device for producing an alternating voltage having positive and negative peaks due to the discharge currents of said capacitance, and an output circuit connected across the last mentioned means.

10. In combination, a source of alternating current, a capacitance connected to be charged from said source during each half cycle of voltage thereof, means for discharging said capacitance comprising a saturable inductive device which is saturable on both half cycles of voltage of said source to cause abrupt increases in the discharge current of said capacitance, means connected in series relation with said capacitance and said device for producing an alternating voltage having positive and negative peaks due to the discharge currents of said capacitance, an output circuit connected across the last mentioned means, and current limiting means connected between the source and said capacitance for limiting the amount of current consumed from said source upon discharge of said capacitance.

11. In combination, an alternating current circuit, a load circuit, electric translating apparatus connected between said circuits and comprising a pair of electric valve means each having an anode, a cathode, and a control member for forming a cathode spot, a capacitance, means for connecting said capacitance with said alternating current circuit to establish a charging circuit therefor, a saturable inductive device, inductive means for connecting said device in series with the cathode-to-control-member circuits of said electric valve means and said capacitance to establish a discharge circuit for said capacitance, said saturable inductive device being symmetrically saturable with respect to the alternating current voltage impressed thereon so that the impedance in the discharge path of said capacitance is suddenly reduced at a predetermined instant in each half cycle of voltage and an impulse of current is supplied to said control member during saturation of said device.

12. In combination, an alternating current circuit, a load circuit, electric translating apparatus connected between said circuits and comprising a pair of electric valve means each having an anode, a cathode, and a control member for forming a cathode spot, a source of alternating current, a capacitance, means for connecting said capacitance with said source to establish a charging circuit therefor, a pair of parallel circuits each including the cathode-to-control-member circuit of one of said electric valve means, each of said circuits also including means for rendering said circuits selectively responsive to impulses of voltage of opposite polarity, a saturable inductive device, transforming means connecting said saturable inductive device and said parallel circuits in series with said capacitance to establish a discharge circuit therefor, said saturable inductive device being saturable during a predetermined portion of each half cycle of voltage of said source to reduce abruptly the impedance of said discharge circuit and thereby transmit impulses of current to the control members of said electric valve means selectively during half cycles of voltage of opposite polarity of said source.

13. In a make-alive type electric valve converter having a supply transformer and at least a pair of make-alive type valves connected to opposed phase terminals of the supply transformer, a control system comprising a make-alive electrode in each of said valves, a pair of rectifiers, said pair of make-alive electrodes being connected in a circuit including said rectifiers in opposed series relation, a source of alternating make-alive potential, a capacitor charged from said source, an impedance for controlling the flow of current from said source to said capacitor, means including a transformer having a winding connected in series relation in said crcuit for supplying energy from said capacitor to said make-alive electrodes, and a saturating reactor connected between said capacitor and said transformer for controlling the flow of current from said capacitor through said make-alive electrodes.

14. In combination, an alternating current circuit, a load circuit, electric translating apparatus connected between said circuits and comprising a pair of electric valve means each having an anode, a cathode, and a control member for forming a cathode spot, a source of alternating current, a capacitance, means for connecting said capacitance with said source to establish a charging circuit therefor, a pair of parallel circuits each including the cathode-to-control-member circuit of one of said electric valve means, each of said circuits also including means for rendering said circuits selectively responsive to impulses of voltage of opposite polarity, a saturable inductive device, means connecting said saturable inductive device and said parallel circuits in series and across said capacitance to establish a discharge circuit therefor, said saturable inductive device being saturable during a predetermined portion of each half cycle of voltage of said source to reduce abruptly the impedance of said discharge circuit and thereby transmit impulses of current to the control members of said electric valve means selectively during half cycles of voltage of opposite polarity of said source.

15. A make-alive control system comprising a valve device, an alternating current source, an inductance device having a saturable core, a capacitor, a series asymmetrically conducting device, a shunting asymmetrically conducting device, a circuit means including said alternating current source for impressing upon said capacitor an alternating voltage having substantially equal positive and negative impulses, circuit means, including said capacitor, for impressing upon said inductance device an alternating voltage having substantially equal positive and negative impulses, in such magnitude as to saturate the inductance device at a portion of each of the positive and negative impulses, make-alive circuit means, including said series asymmetrically conducting device, for utilizing said inductance device to cause peaked positive current impulses to be supplied to a make-alive electrode of said valve device, and a shunting circuit, including said shunting asymmetrically conducting device, connected in shunt circuit relation around said make-alive electrode and said series asymmetrically conducting device, whereby a path is provided for the peaked negative current impulses, an auxiliary winding on said inductance device and means for impressing direct current on said auxiliary winding.

ERNST F. W. ALEXANDERSON.
ALBERT H. MITTAG.

REFERENCES CITED

The following references are of record in the file of this patent:

UNITED STATES PATENTS

| Number | Name | Date |
| --- | --- | --- |
| 1,935,460 | Schmidt | Nov. 14, 1933 |
| 2,137,148 | Suits | Nov. 15, 1938 |
| 2,015,538 | Silverman et al. | Sept. 24, 1935 |
| 2,130,902 | Rose | Sept. 20, 1938 |
| 2,248,600 | Alexanderson et al. | July 8, 1941 |
| 2,248,625 | Herskind | July 8, 1941 |
| 2,248,626 | Herskind | July 8, 1941 |
| 2,250,961 | Livingston | July 29, 1941 |
| 2,190,775 | Edwards | Feb. 20, 1940 |
| Re. 20,317 | Suits | Mar. 30, 1937 |